(12) United States Patent
Makino

(10) Patent No.: US 10,388,281 B2
(45) Date of Patent: Aug. 20, 2019

(54) DIALOGUE CONTROL APPARATUS, DIALOGUE CONTROL METHOD, AND NON-TRANSITORY RECORDING MEDIUM

(71) Applicant: CASIO COMPUTER CO., LTD., Tokyo (JP)

(72) Inventor: Tetsuji Makino, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/222,757

(22) Filed: Jul. 28, 2016

(65) Prior Publication Data

US 2017/0069316 A1  Mar. 9, 2017

(30) Foreign Application Priority Data

Sep. 3, 2015 (JP) .................................. 2015-173701

(51) Int. Cl.
*G10L 15/22* (2006.01)

(52) U.S. Cl.
CPC .................................... *G10L 15/22* (2013.01)

(58) Field of Classification Search
CPC ....... G10L 15/22; G10L 13/02; G10L 15/063; G10L 15/1815; G10L 2015/0635; G10L 15/1822; G06F 17/2785; G06F 17/271; G06F 16/2457; G06F 17/27; G06N 5/02
See application file for complete search history.

(56) References Cited

U.S. PATENT DOCUMENTS

| 8,645,122 B1* | 2/2014 | Di Fabbrizio | G10L 21/00 704/231 |
| 2001/0021909 A1* | 9/2001 | Shimomura | G10L 15/22 704/275 |
| 2006/0047362 A1* | 3/2006 | Aoyama | G10L 15/22 700/245 |
| 2008/0154828 A1* | 6/2008 | Antebi | G06N 5/022 706/46 |

FOREIGN PATENT DOCUMENTS

| JP | 2001-188785 A | 7/2001 |
| JP | 2002-169590 A | 6/2002 |
| JP | 2008-157987 A | 7/2008 |

OTHER PUBLICATIONS

JPO; Application No. 2015-173701; Notification of Reasons for Refusal dated Mar. 12, 2019.

* cited by examiner

*Primary Examiner* — Angela A Armstrong
(74) *Attorney, Agent, or Firm* — Fitch, Even, Tabin & Flannery LLP

(57) ABSTRACT

A determiner in a dialog control apparatus determines whether a reply can be made in response to an utterance made by the dialog partner. If the determiner determines that a reply cannot be made, a creator creates a reply sentence for connecting to a next topic. An utterer utters the reply sentence created by the creator.

14 Claims, 7 Drawing Sheets

FIG. 2

KEYWORD TABLE

| TOPIC | KEYWORD | | | | | |
|---|---|---|---|---|---|---|
| | NOUN WORD | | | ADJECTIVE WORD | | |
| FOOD | VEGETABLE | UDON | RAMEN | GOOD | BAD | SPICY |
| WEATHER | SHINE | RAIN | SUMMER | COOL | HOT | COLD |
| ANIMAL | ELEPHANT | LION | DOG | CUTE | BIG | SCARY |
| FLOWER | CHERRY | MORNING GLORY | FULL BLOSSOM | PRETTY | BEAUTIFUL | SMELLY |
| MATHEMATICS | EQUATION | FUNCTION | DIFFERENTIAL | DIFFICULT | EASY | NON-UNDERSTANDABLE |
| : | : | : | : | : | : | : |

FIG. 3

REPLY SENTENCE TEMPLATES

| TOPIC | CATEGORY | REPLY SENTENCE TEMPLATES | REPLY SENTENCE TEMPLATES |
|---|---|---|---|
| WEATHER | SYMPATHY | It is (adjective word) these days, isn't it? | |
| | | (Noun word) is (adjective word). I agree. | |
| | SELF-DISCLOSURE | I prefer (analogous word) to (noun word). | |
| | | (Noun word) is (adjective word), so I don't like it. | |
| | INFORMATION PROVIDING | The chance of rain in (proper noun referring to a place) is XX%. | |
| | | Today's maximum temperature is XX degrees. | |
| | | You had better carry an umbrella. | |
| | QUESTION | Why do you like (noun word)? | |
| | | Are you usually home on a (adjective word) day? | |

FIG. 4

TEMPLATES FOR INTRODUCTORY REMARKS

| | |
|---|---|
| TEMPLATES FOR UNKNOWNS | I'm not familiar with (unknown word). |
| | I don't know (unknown word). |
| | I have not heard of (unknown word). |
| TEMPLATES FOR APOLOGIES | Excuse me. |
| | Sorry. |
| | I'm sorry. |

FIG. 5

TEMPLATES FOR TOPIC CHANGE

| By the way, are you interested in (noun word)? |
|---|
| Apart from that, why don't we talk about (noun word)? |
| Meanwhile, I hear of (noun word) today. |

FIG. 6

ROUGH INDICATIONS OF RESPONSE TIMES FOR THE DIALOGUE PARTNER

| CATEGORY | TIME |
|---|---|
| SYMPATHY | SHORT |
| SELF-DISCLOSURE | SHORT |
| INFORMATION PROVIDING | SHORT |
| QUESTION | LONG |
| TOPIC CHANGE | SHORT |

FIG. 7

TEMPLATES FOR CHECKING FOR WILLINGNESS TO CONTINUE

| Are you going to continue the conversation? |
|---|
| Do you want to continue the conversation? |

DIALOGUE CONTROL APPARATUS, DIALOGUE CONTROL METHOD, AND NON-TRANSITORY RECORDING MEDIUM

CROSS-REFERENCE TO RELATED APPLICATION

This application claims the benefit of Japanese Patent Application No. 2015-173701, filed on Sep. 3, 2015, the entire disclosure of which is incorporated by reference herein.

FIELD

The present disclosure relates to a dialogue control technique suitable to be employed for interactive robots.

BACKGROUND

Recently, technologies achieving interactive dialogues between a human being and a machine have been in more widespread use. For example, Siri (registered trademark), Pepper (registered trademark), and PALRO (registered trademark) provided by Apple Inc., SoftBank Corp., and FUJISOFT INCORPORATED, respectively, are known.

A talk between a human being and a machine in communication with each other needs artificial intelligence (AI) and speech recognition technologies, but analyzing the context to give responses is not enough to achieve communications. A technology or the like for inferring human emotions is needed.

Unexamined Japanese Patent Application Kokai Publication No. 2001-188785 discloses a technique for making a natural transition to another topic. Specifically, Patent Literature 1 discloses a technique for making a transition to another topic, depending on whether the dialogue has dealt with each item (for example, when, where, who, and what was done) that serve as indicators of whether the parties have exhausted a topic.

SUMMARY

A dialogue control apparatus holding a dialogue with a dialogue partner who is a user, the apparatus includes:
a reply sentence obtainer obtaining a reply sentence in response to an utterance made by the dialogue partner;
an utterer uttering a reply sentence obtained by the reply sentence obtainer; and
a determiner determining whether a reply can be made in response to an utterance made by the dialogue partner based on whether an unknown word is used,
wherein, if the determiner determines that a reply cannot be made, the reply sentence obtainer obtains a reply sentence for connecting to a next topic.

BRIEF DESCRIPTION OF THE DRAWINGS

A more complete understanding of this application can be obtained when the following detailed description is considered in conjunction with the following drawings, in which:

FIG. 2 shows an example keyword table;

FIG. 3 shows example reply sentence templates;

FIG. 4 shows example templates for introductory remarks;

FIG. 5 shows example templates for topic change;

FIG. 6 shows example rough indications of response times taken by the dialogue partner;

FIG. 7 shows example templates for checking for a willingness to continue;

DETAILED DESCRIPTION

Figure 1:
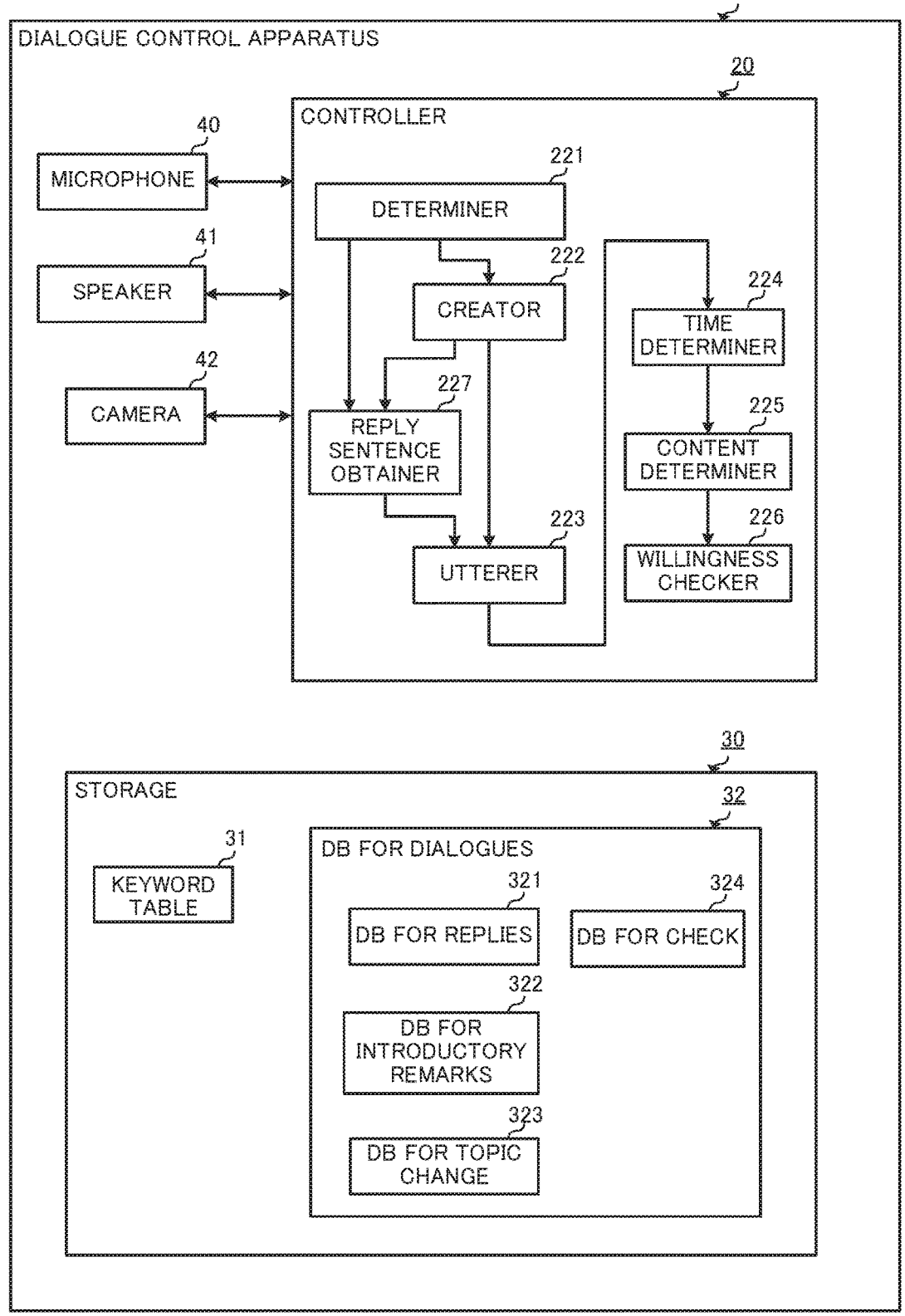
FIG. 1 is a block diagram illustrating a configuration of a dialogue control apparatus according to an embodiment.

Referring to FIG. 1, the following provides general descriptions of a dialogue control apparatus according to an embodiment of the present disclosure. The dialogue control apparatus 10 includes, as physical interfaces with the dialogue partner, a microphone 40, which collects sounds made by the dialogue partner, a speaker 41, which outputs sounds toward the dialogue partner, and a camera 42, which takes images of the dialogue partner.

The dialogue control apparatus 10 infers emotions based on the sounds and images given by the microphone 40 and the camera 42, respectively, and holds a dialogue through the speaker 41 about a topic appropriate for the inferred emotions.

Note that the dialogue control apparatus 10, which is a dialogue engine, may be applied to a robot. The dialogue control apparatus 10 represents the artificial intelligence that can be applied to virtually any situation where a dialogue with a human being is needed, and thus the apparatus is of wide applications including car navigation systems, interactive applications on smartphones, and digital two-dimensional characters. Also note that the terms "dialogue", "conversation", and "communication" are hereinafter deemed to be synonymous with one another in that each of the terms means exchanging information interactively in natural language.

The dialogue control apparatus 10 includes a controller 20 and a storage 30, in addition to the physical interfaces with the dialogue partner (microphone 40, speaker 41, and camera 42).

The controller 20 includes a central processing unit (CPU), read only memory (ROM), random access memory (RAM), and the like. The controller 20 realizes the function of each unit (a determiner 221, a creator 222, an utterer 223, a time determiner 224, a content determiner 225, and a willingness checker 226) by executing programs (for example, programs related to the dialogue control processing described later) stored in the ROM.

The storage 30 is non-volatile memory, such as a hard disk or flash memory, storing a database (database (DB) for dialogues 32) and a keyword table 31. These will be described later.

Functions of the controller 20 will now be described.

The controller 20 includes, as functions, the determiner 221, the creator 222, the utterer 223, the time determiner 224, the content determiner 225, and the willingness checker 226. And the controller 20 also includes a reply sentence obtainer 227. The reply sentence obtainer 227 obtains a reply sentence from the database or the creator 222.

The determiner 221 determines whether a reply can be made in response to an utterance made by the dialogue partner. Specifically, the determiner 221 converts an utterance made by the dialogue partner into text, obtains a plurality of words (nouns, adjectives, verbs, auxiliary verbs, and the like) through a morphological analysis, and then determines whether a reply can be made depending on whether a keyword is included in the plurality of words. It is determined whether a keyword is present by using the keyword table 31 illustrated in FIG. 2.

The keyword table 31 is created based on a word dictionary and the like and contains noun words and adjective words that are associated with each topic. A noun word and an adjective word refer to a noun and an adjective, respectively, relating to a topic.

FIG. 2 shows only part of the keywords necessary for dialogues; the prepared keywords indeed amount to several tens of thousands of words per topic. In addition, hierarchical relationships (for vegetables, for example, the superordinate concept, vegetable, includes subordinate concepts such as cabbage and onion) and analogous relationships (for example, ramen is analogous to udon in that both are noodles) are associated with every keyword. Advantageously, when an unknown word is uttered by the dialogue partner, the determiner 221 learns the word by adding it as a new keyword.

After performing a morphological analysis of the text into which the dialogue partner's speech has been converted through speech recognition, the determiner 221 determines that a reply can be made if any of the resulting words (noun and/or adjective) matches a keyword (noun word or adjective word), in other words, if the utterance made by the dialogue partner includes any keyword. On the other hand, the determiner 221 determines that a reply cannot be made if the utterance made by the dialogue partner includes no keyword.

To increase opportunities to reply, it is advantageous for the controller 20 to identify a topic and speak to the dialogue partner first. It is advantageous for the controller 20 to identify a topic in advance and start a dialogue so as to get as many keywords as possible by saying, for example, "Let's talk about food" for the topic "food", or "Let's talk about animals" for the topic "animal". This is because, according to the present embodiment, every topic is associated with a keyword, and thus the dialogue control apparatus 10 is less likely to be able to reply if no topic is identified.

Referring back to FIG. 1, the creator 222 creates a reply sentence for replying to the dialogue partner. Reply sentences are divided into: 1) reply sentences to be used if the determiner 221 determines that a reply can be made, in other words, that a keyword is included; and 2) reply sentences to be used if the determiner 221 determines that a reply cannot be made, in other words, that no keyword is included.

In the case of 1), that is, if a reply can be made, the creator 222 creates a reply sentence based on reply sentence templates stored in a DB for replies 321. The DB for replies 321 constitutes databases storing a plurality of different reply sentence templates categorized by topics. The reply sentence templates can be written in a markup language such as Extensible Markup Language (XML). Specifically, the reply sentence templates are written in Artificial Intelligence Markup Language (AIML) in advance and, when an utterance made by the dialogue partner includes any keyword (noun word or adjective word), the creator 222 creates a reply sentence template using the keyword.

FIG. 3 shows example variations of reply sentence templates on the topic "weather". A reply sentence template is formed so as to make a reply, if an utterance made by the dialogue partner includes any keyword contained in the keyword table 31, by substituting the keyword (noun word or adjective word) into the template. An analogous word refers to a keyword having an analogous relationship in the keyword table 31 (for example, spring, summer, fall, and winter each representing a season are analogous words). The listed categories (Sympathy, Self-Disclosure, Information Providing, and Question) are examples only, and other category types may be created.

For example, if the keyword "summer" is included in an utterance made by the dialogue partner about the topic "weather", the creator 222 would reply, like "Summer is hot. I agree", using a reply sentence template for Sympathy, or "I prefer winter to summer", using a reply sentence template for Self-Disclosure, or "Why do you like summer?", using a sentence template for Question. Which category to select from these templates may be determined at random or according to the context based on dialogue history or the priorities. During a dialogue, a reply sentence template that was once selected is not to be selected again.

Information Providing is a category of templates for providing information pertaining to results of Internet searches. The creator 222 actively obtains such information relating to Information Providing (for example, chance of rain or highest temperature) triggered by a request for search sent from the dialogue partner or at an appropriate timing. The creator 222 produces an utterance by substituting the obtained information into a reply sentence template for Information Providing. As for proper nouns of places, the creator 222 only needs to substitute the name of a place into a template, if the name is included in an utterance made by the dialogue partner.

It is assumed that one reply sentence template is shared by a plurality of keywords with the view to broaden utility, but not all templates are shared by a plurality of keywords. A specific keyword may be associated with a reply sentence as the keyword's own sentence. For example, the noun word "lion" falling under the topic "animal" may be associated with a plurality of reply sentence templates dedicated to lions, such as "The mane of a lion is seen on only male lions, isn't it?" and "The lion is called the king of beasts, right?", and any of these templates may be selected at random for utterance.

In this way, in the case of 1) above, that is, if a reply can be made, the creator 222 uses reply sentence templates based on keywords to have a topic-based dialogue that includes at least several turns, not a single question and answer. On the other hand, in the case of 2), that is, if a reply cannot be made, the creator 222 creates a reply sentence for connecting to a next topic and a reply sentence for topic change for changing to the next topic. Specifically, the creator 222 creates reply sentences using templates for introductory remarks stored in the DB for introductory remarks 322 as well as using templates for topic change stored in the DB for topic change 323. FIG. 4 shows example variations of templates for introductory remarks, while FIG. 5 shows example variations of templates for topic change.

As shown in FIG. 4, the templates for introductory remarks for connecting to a next topic includes templates respectively expressing lack of knowledge or an apology. The reply sentences for connecting to a next topic, that is, the templates for introductory remarks, suggest changing topics to the dialogue partner. The present embodiment uses templates expressing unknowns and apologies as examples of such reply sentences. An apology is to be given before lack of knowledge is expressed. For example, if the dialogue partner utters the noun "El Nino" concerning the topic "weather", and such noun word is not included in keywords, then reply sentences would be composed, such as "Sorry. I'm not familiar with El Nino" or "I'm sorry. I have not heard of El Nino."

After creating a reply sentence for connecting to a next topic, the creator 222 creates a reply sentence for topic change referring to FIG. 5. A reply sentence for topic change as used herein means a reply sentence that is used, following the reply sentence for connecting to a next topic uttered before topic change, for changing to the next topic. Topic change as used herein includes changing to another topic falling under the topic of the current dialogue, as well as changing to another topic included in the keyword table 31. For example, if the topic of the current dialogue is "weather", topic change includes changing to another topic falling under "weather" (for example, changing from today's weather to a seasonal topic) as well as changing topics from "weather" to another topic (for example, "animal").

FIG. 5 shows some variations of templates for topic change. For topic change, it is advantageous to use a noun word relating to an unknown word. For example, if the noun "flower pollen" is included in the utterance made by the dialogue partner but is not included in keywords, it is advantageous to select a noun word relating to the unknown word "flower pollen" to change topics. Since the unknown word "flower pollen" includes the noun word "flower", the creator 222 can select "flower" as a noun word and create, for example, "By the way, are you interested in flowers?" for changing topics.

Alternatively, the creator 222 may also access the Internet to search for the current hot topics relating to "flower", and select a noun word relating to hot topics about "flower". For example, if a search with the word "flower" results in a lot of matches with topics about cherry blossom, the creator 222 can select the noun words "cherry" and "full blossom" and create a sentence like "Meanwhile, I hear of full cherry blossom today" for changing topics.

In this way, if an utterance made by the dialogue partner includes an unknown word, an attempt is made to change topics by selecting a noun word relating to the unknown word. However, if it is difficult to select a noun word relevant to an unknown word such as "El Nino" as mentioned above, a reply sentence for topic change can be created by selecting a noun word without regard to relevance (for example, any keyword that is not uttered yet about the current topic "weather", or a totally different topic such as "animal").

As described above, in the case of 1), that is, if a reply can be made, the creator 222 creates a reply sentence using a keyword (noun word or adjective word) included in the speech made by the dialogue partner, according to reply sentence templates. On the other hand, in the case of 2), that is, if a reply cannot be made, the creator 222 creates a reply sentence for connecting to a next topic (a reply sentence expressing an apology and lack of knowledge) and a reply sentence for topic change, in accordance with the templates for introductory remarks and the templates for topic change. And reply sentence obtainer 227 obtains the reply sentence which is created by the creator 222.

Referring back to FIG. 1, the utterer 223 uses the speaker 41 to utter the reply sentence obtained by the reply sentence obtainer 227 or created by the creator 222. Specifically, in the case of 1), that is, if a reply can be made, the utterer 223 utters a reply sentence that is associated with a keyword. On the other hand, in the case of 2), that is, if a reply cannot be made, the utterer 223 utters a reply sentence for connecting to a next topic and then utters a reply sentence for changing topics.

Next, the time determiner 224 determines whether the dialogue partner has replied within a predetermined time to the utterance made by the utterer 223. The predetermined time, which may be five seconds, for example, is used as a measure of determining whether the dialogue partner is slow to respond.

The content determiner 225 determines whether the content of an utterance made by the utterer 223 requires a longer response time. The determination is made based on rough indications of response times necessary for the dialogue partner as shown in FIG. 6. The table in FIG. 6 contains short or long response times necessary for the dialogue partner, associated with the each category (Sympathy, Self-Disclosure, Information Providing, and Question) listed in reply sentence templates in shown FIG. 3. In general, questions require a longer response time because the dialogue partner has to think. In contrast, the Topic Change category is assigned an indication of a shorter response time because a sentence asking whether the dialogue partner is interested in a new topic (whether the partner is willing to talk about the topic) constitutes a closed question that can be answered with Yes or No.

Next, the willingness checker 226 checks whether the dialogue partner is willing to continue the dialogue, depending on the determination results provided by the time determiner 224 and the content determiner 225. A willingness to continue the dialogue is checked for in the case where the time determiner 224 determines that there has been no reply within a predetermined time and the content determiner 225 determines that the content of the utterance does not require a longer response time. For example, the willingness is checked for if the dialogue partner takes five seconds or more to reply in spite of the fact that the content of the utterance made by the dialogue control apparatus 10 represents Self-Disclosure, which does not require a long response time.

To check for a willingness to continue the dialogue, the willingness checker 226 references the templates for checking for a willingness to continue in FIG. 7 stored in the DB for check 324 to create a reply sentence, and then utters the reply sentence through the speaker 41.

A willingness to continue is not checked for either: a) if the time determiner determines that there has been a reply within a predetermined time; or b) if the time determiner 224 determines that there has been no reply within a predetermined time and the content determiner 225 determines that the content of the utterance requires a longer response time.

Figure 8:
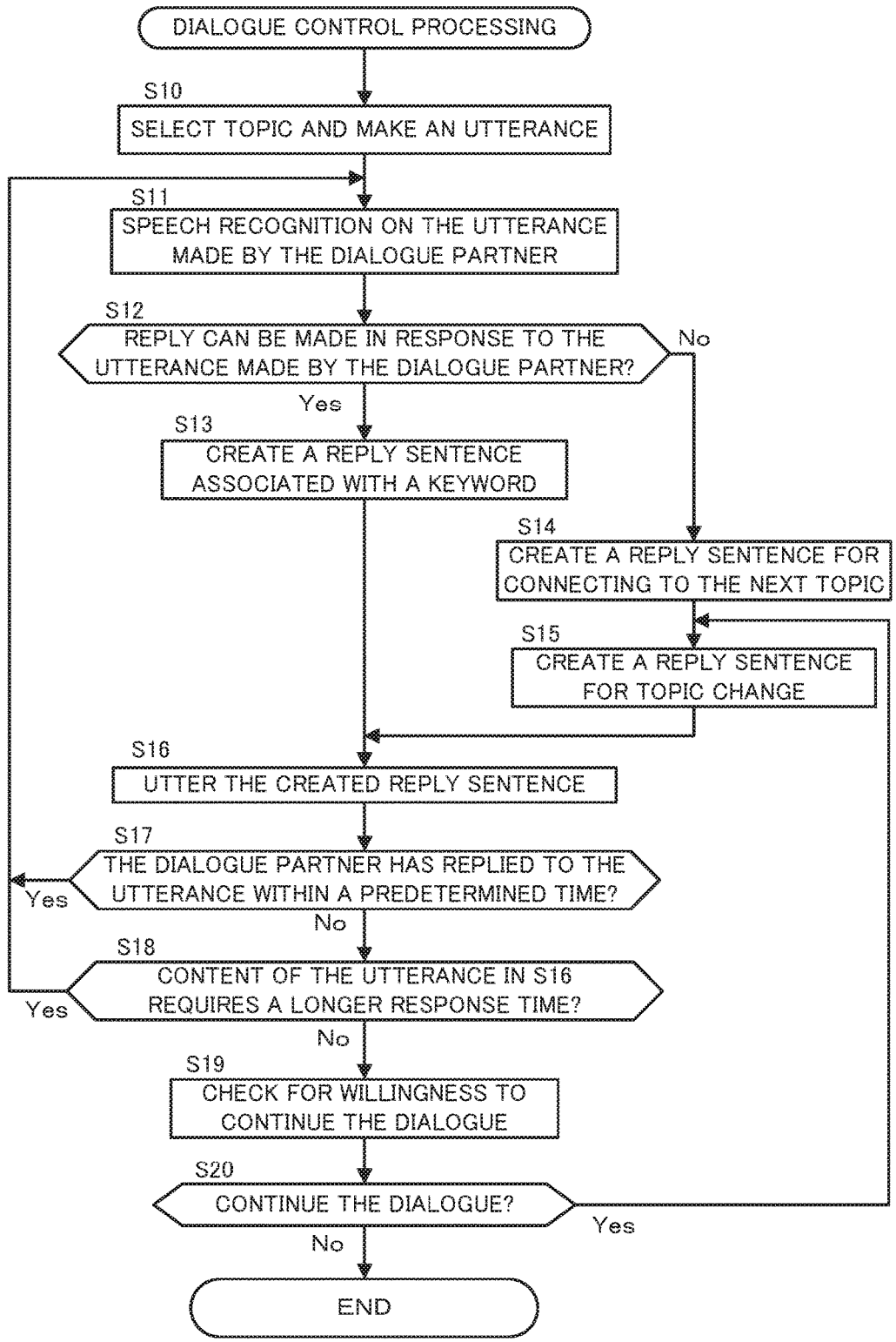
FIG. 8 is an example flow chart for dialogue control processing.

Functions of the controller 20 in the dialogue control apparatus 10 have been described above with reference to a plurality of templates. Dialogue control processing realized by each of these functions will now be described with reference to the flow chart in FIG. 8. The dialogue control apparatus 10, with its dialogue functions turned on, starts the dialogue control processing triggered by the camera 42 taking an image of the dialogue partner.

First, the controller 20 selects a topic and makes an utterance about the topic (Step S10). To increase chances of response, the controller 20 narrows down dialogue topics to any of the topics listed in the keyword table (according to the present embodiment, the keyword table 31 shown as an example) in this step. For example, the controller 20 utters "Let's talk about food", which is about the randomly selected topic "food".

Next, the determiner 221 performs speech recognition on an utterance made by the dialogue partner (Step S11), and then determines whether a reply can be given in response to the utterance made by the dialogue partner (Step S12). Specifically, the determiner 221 performs a morphological analysis of the text into which the voice has been converted, and determines whether the text includes any keyword (noun word or adjective word) that is included in the keyword table 31.

In case the speech recognition leads to the finding that the dialogue partner clearly shows no willingness to talk about the selected topic by saying, for example, "I'm not interested in the topic", or "I don't want to talk about the topic, the controller 20 may either return to Step S10 to select a topic again, or wait for another utterance to be made by the dialogue partner without selecting another topic.

Then, if a reply can be made in response to the utterance of the dialogue partner (Yes in Step S12), that is, if the utterance includes any keyword, the creator 222 creates a reply sentence associated with the keyword (Step S13). For example, if the dialogue partner utters the noun word "ramen" in relation to the topic "food", the creator 222 creates a reply sentence, such as "Ramen is good, isn't it? I like it too", using a reply sentence template for Sympathy, "I prefer udon to ramen", using a reply sentence template for Self-Disclosure, "Which taste of ramen do you like?", using a reply sentence template for Question, and so on. Which reply sentence to create can be determined based on the dialogue history, priorities, or context.

On the other hand, if a reply cannot be made in response to the utterance of the dialogue partner (No in Step S12), that is, if the utterance includes no keyword, the creator 222 creates a reply sentence for connecting to a next topic (Step S14), and then creates a reply sentence for changing topics (Step S15). For example, if the partner utters an unknown word "avocado" in relation to the topic "food", the creator 222 uses the templates for introductory remarks and the templates for topic change to create reply sentences such as "Sorry. I'm not familiar with avocado" and "By the way, are you interested in animals?" In this example, it is difficult to select a noun word relevant to the unknown word "avocado", and thus the creator 222 changes to a different topic "animal" as the next topic without regard to relevance.

After Step S13 or Step S15, the utterer 223 utters the created reply sentence (Step S16). Then, the time determiner 224 determines whether the dialogue partner has replied within a predetermined time (Step S17). If the dialogue partner has replied within a predetermined time (Yes in Step S17), the processing returns to Step S11 to continue the dialogue by performing speech recognition on an utterance made by the dialogue partner.

Utterances made by the dialogue partner may include a simple word expressing agreement or a Yes/No answer. For example, the dialogue partner could reply with such words as "Oh, really?" in response to "Ramen is good. I like it too", or "Yes, I am" in response to "Are you interested in animals?" In such cases, it is impossible to determine whether a keyword is included, and accordingly it is advantageous for the dialogue control apparatus 10 to encourage the dialogue partner to make a further utterance after some pause, or to ask a question or the like to urge the dialogue partner to make a further utterance.

On the other hand, if the dialogue partner has made no reply within a predetermined time (No in Step S17), the content determiner 225 determines whether the content of the utterance made in Step S16 requires a longer response time (Step S18). In this example, the content determiner 225 references the table in FIG. 6 to determine whether the content of the utterance requires a longer response time. That is, in the above example, the content determiner 225 determines that a longer response time is not required for the utterances falling under Sympathy, Self-Disclosure, or Topic Change other than "Which taste of ramen do you like?", which falls under Question.

If the content of the utterance made in Step S16 is such that a longer response time is required (Yes in Step S18), the processing returns to Step S11. This applies to, for example, the case where the dialogue partner starts replying to the question asked by the dialogue control apparatus 10: "Which taste of ramen do you like?" after a predetermined time (five seconds, for example) has passed.

On the other hand, if the content of the utterance made in Step S16 does not require a longer response time (No in Step S18), the willingness checker 226 checks for a willingness to continue the dialogue (Step S19). This applies to, for example, the cases where the dialogue partner makes no reply within a predetermined time in response to a statement like "Ramen is good. I like it too", which was created by using a reply sentence template for Sympathy, or "By the way, are you interested in animals?", which was created by using a reply sentence template for Topic Change, including, for example, the case where the dialogue partner remains silent or replies by saying "I'm not interested in animals" or the like after a predetermined time has passed.

In such cases, the willingness checker 226 determines whether to continue the dialogue by uttering, for example, the sentence "Do you want to continue the conversation?" according to a template for checking a willingness to continue shown in FIG. 7 (Step S20). If the dialogue partner expresses the willingness not to continue the conversation by saying, for example, "I don't want to continue the conversation", the willingness checker 226 determines not to continue the dialogue (No in Step S20) to terminate the processing. On the other hand, if the dialogue partner expresses the willingness to continue the conversation by saying, for example, "I want to continue the conversation", the willingness checker 226 determines to continue the dialogue (Yes in Step S20), then the processing returns to Step S15 and the creator 222 creates a reply sentence for topic change for changing to a next topic. In this step, the reply sentence is created so as to switch to a new topic other than those which are already dealt with ("food" and "animal" in the above-described example). Consequently, if the dialogue partner expresses the willingness to continue in response to the willingness checker 226 checking for the willingness to continue, the utterer 223 utters, in Step S16, a reply sentence for topic change for changing to the next topic.

The dialogue control processing performed by the dialogue control apparatus 10 has been described above. The following describes the dialogue control processing referring to Specific Example 1. It is assumed here that a dialogue is held between the dialogue control apparatus 10 illustrated in FIG. 1 and a dialogue partner, with symbols (1), (2), and so on given to each piece of the dialogue on a time-series basis.

SPECIFIC EXAMPLE 1

(1) Dialogue Control Apparatus 10: "Let's talk about weather."
(2) Dialogue Partner: "OK. Is it cool today?"
(3) Dialogue Control Apparatus 10: "Today's highest temperature is XX° C."
(4) Dialogue Partner: "Today is cool too, isn't it?"
(5) Dialogue Control Apparatus 10: "These days it is cool."

(6) Dialogue Partner: "Yes. Is there a lot of flower pollen today?"

(7) Dialogue Control Apparatus 10: "Sorry. I'm not familiar with flower pollen."

(8) Dialogue Control Apparatus 10: "Anyways, I hear that the cherry blossoms are in full bloom as of today."

(9) Dialogue Partner: "I know. I want go cherry blossom viewing."

(10) Dialogue Control Apparatus 10: "I'm sorry. I have not heard of cherry blossom viewing."

(11) Dialogue Partner: "Cherry blossom viewing is a Japanese custom in which people drink alcohol while viewing cherry blossoms together under the cherry blossoms."

(12) Dialogue Control Apparatus 10: "Thanks to you I could learn about cherry blossom viewing."

(13) Dialogue control apparatus 10: "By the way, are you interested in flowers?"

(14) Dialogue partner: "I'm not so interested . . . "

(15) Dialogue Control Apparatus 10: "Do you want to continue the conversation?"

(16) Dialogue Partner: "Yes."

(17) Dialogue control apparatus 10: "By the way, . . . "

Subsequent to (15), the dialogue still goes on. According to Specific Example 1, in (1) an utterance is made by selecting the topic "weather"; in (3) a search is performed triggered by the question asked by the dialogue partner, and the search result (highest temperature) is provided as information; and in (5) sympathy is expressed with the adjective word "cool" found in the utterance made by the dialogue partner. So far, the dialogue constitutes an example where replies can be made to utterances made by the dialogue partner (Steps S11 to S13, Step S16, and Step S17 in a loop).

In (7), because the noun word "flower pollen" uttered by the dialogue partner is not included in keywords, the apparatus expresses an apology and lack of knowledge by using reply sentences for connecting to a next topic. Then in (8), the apparatus changes topics by using the current hot topic, full cherry blossom, which is about the topic "flower" related to the unknown word "flower pollen" (Steps S14 to S16).

In (10), because the noun word group "flower blossom viewing" uttered by the dialogue partner is not included in keywords, the apparatus expresses an apology and lack of knowledge by using sentences for connecting to a next topic. Then in (11), the apparatus changes topics regarding the topic "flower", which relates to the unknown words "flower blossom viewing". The dialogue so far constitutes an example where replies cannot be made to utterances made by the dialogue partner (Steps S11, S12, and S14 to S17 in a loop).

Subsequently, in response to changing to the topic "flower" in (11), the dialogue partner replies in (12) "I'm not so interested . . . " after a predetermined time has passed in (No in both Steps S17 and S18). Accordingly, in (13) the dialogue control apparatus 10 checks whether the dialogue partner is willing to continue the dialogue (Step S19), then in (14) the dialogue partner expresses the willingness to continue, which in turn allows the dialogue control apparatus 10 to continue the dialogue by changing to a new topic excluding "weather" and "flower".

As described above, the dialogue control apparatus 10 includes the each function (the determiner 221, the creator 222, and the utterer 223) so as to utter a reply sentence to connect to a next topic in case the apparatus 10 is unable to reply to an utterance made by the dialogue partner. Therefore, the apparatus 10 can avoid changing topics abruptly or uttering nonsensical phrases. Thus, the dialogue partner sees no abrupt change to another topic departing from the current context of the conversation, which means the apparatus 10 provides the effect of transitioning to a new topic without causing uncomfortable feelings to the dialogue partner.

The creator 222 creates a sentence that suggests topic change to the dialogue partner, as a reply sentence for connecting to a next topic. The creator 222 creates a reply sentence expressing lack of knowledge or an apology, which is an example reply according to the present embodiment. Giving an apology avoids hurting the dialogue partner's feelings, while expressing lack of knowledge allows the dialogue partner to infer that the topic will be changed. Thus, inserting an extra step prior to topic change in the form of introductory remarks allows for changing to a new topic that is favorable for the dialogue control apparatus 10.

When the determiner 221 determines that a reply can be made, in other words when the determiner 221 determines that the utterance made by the dialogue partner includes any keyword, the creator 222 creates a reply sentence associated with the keyword. Hence, the dialogue partner can enjoy several turns of a dialogue with the dialogue control apparatus 10 as long as any keyword is included in utterances.

On the other hand, when the determiner 221 determines that a reply cannot be made, the creator 222 creates a reply sentence for topic change for changing to another topic relating to a word (in particular, an unknown word) included in the utterance made by the dialogue partner. For the dialogue partner, this appears to be a natural transition to another relevant topic, and thus the topic can be changed without causing uncomfortable feelings to the dialogue partner. Moreover, the dialogue is transitioned to another topic by selecting keywords relating to a current seasonal subject of the topic (for example, "cherry" and "full blossom" according to the above example). Therefore, the dialogue can be transitioned to a hot topic that the dialogue partner is curious about, and thus the dialogue partner keeps on enjoying the conversation without getting bored.

In addition, the dialogue control apparatus 10 includes the each function (the time determiner 224, the content determiner 225, and the willingness checker 226) so as to ask the dialogue partner if the partner is willing to continue the dialogue depending on determination results provided by the time determiner 224 and the content determiner 225. Specifically, the willingness checker 226 checks for a willingness to continue the dialogue when the dialogue partner is slow to reply (that is, the partner fails to reply within a predetermined time) in spite of the fact that the content of the utterance made by the dialogue control apparatus 10 does not require a longer response time.

The dialogue partner may sometimes be slow to reply because the partner takes time to think what to reply. In other words, when the dialogue control apparatus 10 asks the dialogue partner a question that cannot be answered with "Yes" or "No" (an open question), the dialogue partner has to think a while before replying. In this case, an immediate check for a willingness to continue the dialogue simply because the dialogue partner is slow to reply would hurt feelings of the dialogue partner. According to the present disclosure, when the dialogue partner is slow to reply, the dialogue control apparatus 10 checks for the partner's willingness to continue the dialogue depending on whether the content of the utterance made by the apparatus 10 requires a longer response time. Consequently, a willingness to continue the dialogue can be checked for more accurately and without hurting feelings of the dialogue partner, compared with checking for the willingness simply because the dialogue partner is slow to reply.

Embodiments have been described above, but these embodiments are examples only, and obviously configurations of the dialogue control apparatus 10 and specifics of the dialogue control processing are not limited to the descriptions of the above embodiments.

According to embodiments described above, the controller 20 identifies a topic to start the dialogue, from the viewpoint of increasing chances of response made by the dialogue control apparatus 10, but this is not the only way to start a dialogue. For example, speech recognition may be performed on an utterance made by the dialogue partner, skipping Step S10 where the controller selects a topic and makes an utterance. In this case, if the dialogue partner makes an utterance irrelevant to any topic resulting in a decrease in chances of response, the dialogue can still be continued without causing uncomfortable feelings to the dialogue partner because the dialogue control apparatus utters introductory remarks before changing topics.

According to the embodiment described above, the keyword table 31 contains noun words and adjective words associated with every topic, but the keyword table may be otherwise than this. For example, verb words may be associated with a topic (for example, a verb "to solve" associated with mathematics) and reply sentences may be prepared by using these verbs. Furthermore, any keyword may be associated not only with a topic but also with a routine scenario so as to increase variations of utterances made by the dialogue control apparatus 10. For example, it is advantageous to associate keywords "good morning", "good afternoon", and "good evening" to the scenario "greetings" and prepare reply sentence templates associated with these keywords (for example, "Good morning to you" in response to "Good morning").

According to the embodiment described above, the time required for the dialogue partner to reply is set to be long or short depending on the category as shown in FIG. 6, but this is not the only way of setting times. FIG. 6 shows examples only, and the long or short time may be specified in more detail. For example, with regard to the category "Question", "Long" and "Short" may be respectively associated with open questions and closed questions. In addition, a long time may be assigned to Sympathy or Self-Disclosure depending on the content. In short, the time may be determined to be long or short depending on the content of an utterance made by the dialogue control apparatus 10.

According to the described example, the "dialogue" is made by replying to each other using speech sounds, but the dialogue may be held with characters by using a keyboard and display. For example, the dialogue control apparatus 10 may be built into a PC so that the user (dialogue partner) and the PC (dialogue control apparatus 10) can enjoy a conversation with each other such as the above-described specific example as if they are having a chat. In this case, speech prosody is not available for inferring emotions, but emotions can be inferred from facial expressions of the dialogue partner taken by the camera 42, content of exchanged messages (emotions are inferred from words expressing positive or negative emotions), or speed or strength of touches on the keyboard.

The each function of the dialogue control apparatus 10 according to the present disclosure can also be implemented by a computer such as a general PC. Specifically, the above embodiment has been described with the assumption that programs for the dialogue control processing to be performed by the dialogue control apparatus 10 are stored in ROM in the controller 20 in advance. Instead, a computer may be configured to implement the above-described each function by distributing the programs stored in a non-transitory computer-readable recording medium, such as a flexible disk, compact disc read-only memory (CD-ROM), digital versatile disc (DVD), or magneto-optical disc (MO), and installing the programs on the computer. Furthermore, a robot with communication capabilities is implemented by installing the dialogue control apparatus 10 of the present disclosure on the robot.

Figure 9:
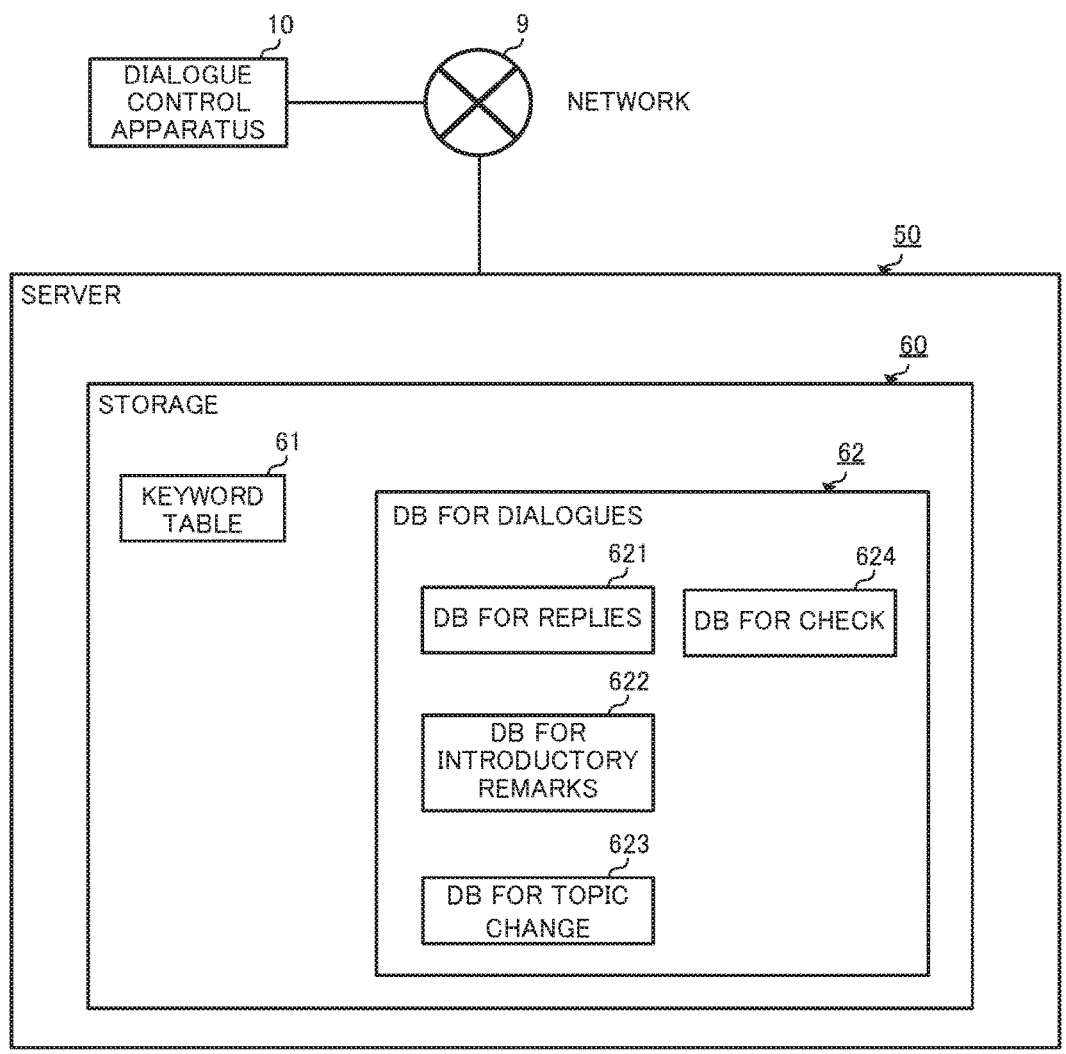
FIG. 9 is a block diagram illustrating another configuration of a dialogue control apparatus according to an embodiment.

According to the above-described example, the DB for dialogues 32 and the keyword table 31 are stored in the storage 30 that is included in the dialogue control apparatus 10. However, as illustrated in FIG. 9, the DB for dialogues 62 and the keyword table 61, in part or in whole, may be stored in the storage 60 that is included in a server 50 connected to a network 9. In this case, the dialogue control apparatus 10 accesses the DB for dialogues 62 and the keyword table 61 over the network 9. The network 9 mentioned above represents a network linked by communication line such as the Internet or a local area network (LAN). The DB for dialogues 62 may be the same as the DB for dialogues 32 or may be a DB containing extended entries compared with the DB for dialogues 32. Likewise, the keyword table 61 may have the same contents as the keyword table 31, or may contain extended registered keywords compared with the keyword table 31. The keyword table 31 needs not be present as long as the dialogue control apparatus 10 can access the keyword table 61, and the DB for dialogues 32 needs not be present as long as the apparatus 10 can access the DB for dialogues 62. FIG. 1 shows that the DB for dialogues 32 stores the DB for replies 321, the DB for introductory remarks 322, the DB for topic change 323, and the DB for check 324, and accordingly FIG. 9 shows the configuration where the DB for dialogues 62 stores the DB for replies 621, the DB for introductory remarks 622, the DB for topic change 623, and the DB for check 624. However, other configurations may be available. For example, in one possible configuration, the DB for dialogues 62 stores the DB for replies 621 only, while the DBs stored in the DB for dialogues 32 are used as other DBs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A dialogue control method for dialogue control processing for controlling, in a dialogue with a dialogue partner, a dialogue control apparatus including a controller and a storage, the storage including (i) a keyword table storing, for each topic of a plurality of topics, keywords relating to the topic, (ii) a database for replies storing a plurality of different reply sentences for each topic, (iii) a database for introductory remarks storing a plurality of sentences for suggesting a change of topic to the dialogue partner, and (iv) a database for topic change storing a plurality of reply sentences for connecting to a next topic, the dialogue control processing comprising:

recognizing by the controller an utterance by the dialogue partner, and determining by the controller whether a keyword stored in the keyword table is included in the utterance;

upon determination that the utterance includes a keyword stored in the keyword table, determining by the controller that a reply can be made;
upon determination that the utterance does not include the keyword stored in the keyword table, determining by the controller that the reply cannot be made;
upon determination that the reply can be made, creating by the controller the reply sentence based on the database for replies; and
upon determination that the reply cannot be made, creating by the controller, based on the database for introductory remarks and the database for topic change, (i) a sentence for suggesting a change of topic of the plurality of sentences for suggesting a change of topic, (ii) a reply sentence for connecting to the next topic of the plurality of sentences for connecting to a next topic, and (iii) a reply sentence for changing the topic to the next topic, wherein
the dialogue control processing is started when a camera of the dialogue control apparatus takes an image of the dialogue partner.

2. The dialogue control method according to claim 1, further comprising:
inferring an emotion from a facial expression of the dialogue partner based on the facial expression taken by the camera of the dialogue control apparatus, wherein
the creating of the reply sentence for connecting to the next topic or for changing the topic by the controller is further based on the topic and the database for replies in accordance with the inferred emotion.

3. The dialogue control method according to claim 1, further comprising:
speaking, by the dialogue control apparatus, the created reply sentence for connecting to the next topic or for changing the topic.

4. The dialogue control method according to claim 1, wherein the keywords stored in the keyword table comprise:
(i) for each topic, at least one noun word corresponding to a noun related to the topic,
(ii) for each topic, at least one adjective word corresponding to an adjective related to the topic.

5. The dialogue control method according to claim 1, wherein the reply sentence for connecting to the next topic created by the controller is created by the controller as the sentence for suggesting a change of topic based on the database for topic change.

6. The dialogue control method according to claim 5, wherein the reply sentence for suggesting a change of topic to the dialogue partner is a sentence expressing an apology or a lack of knowledge.

7. The dialogue control method according to claim 5, wherein the reply sentence for suggesting a change of topic to the dialogue partner is a sentence that, after a sentence expressing an apology or a lack of knowledge, further continues with the reply sentence for changing the topic to the next topic.

8. The dialogue control method according to claim 1, wherein the next topic to which the topic of the dialogue is changed by the reply sentence for changing the topic to the next topic is related to a word included in the utterance by the dialogue partner.

9. The dialogue control method according to claim 3, wherein the storage further includes a database for check for storing a plurality of sentences for checking a willingness of the dialogue partner to continue the dialogue, and
the method further comprises:
after an utterance by the dialogue control apparatus, determining whether the dialogue partner replies within a prescribed period, and
upon determination that there is no reply within the prescribed period, creating a sentence to check the willingness of the dialogue partner to continue the dialogue based on the database for check.

10. The dialogue control method according to claim 9, further comprising:
determining whether content of an utterance of the dialogue control apparatus is an open question or a closed question;
changing the predetermined period in accordance with a result of the determination of whether the content of the utterance of the dialogue control apparatus is the open question or the closed question.

11. The dialogue control method according to claim 9, further comprising:
determining whether content of an utterance of the dialogue control apparatus requires a period for response; and
checking the willingness of the dialogue partner to continue the dialogue based on a result of the determination of whether the content of the utterance of the dialogue control apparatus requires the period for response.

12. The dialogue control method according to claim 9, further comprising:
uttering by the dialogue control apparatus of the sentence to check the willingness of the dialogue partner to continue the dialogue;
upon a result of the uttering by the dialogue control apparatus of the sentence to check the willingness of the dialogue partner to continue the dialogue indicating that the dialogue partner is willing to continue the dialogue, the controller creates the reply sentence for changing the topic to the next topic.

13. A dialogue control apparatus for holding a dialogue with a dialogue partner, comprising:
a controller; and
a storage including (i) a keyword table storing, for each topic of a plurality of topics, keywords relating to the topic, (ii) a database for replies storing a plurality of different reply sentences for each topic, (iii) a database for introductory remarks storing a plurality of sentences for suggesting a change of topic to the dialogue partner, and (iv) a database for topic change storing a plurality of reply sentences for connecting to a next topic, wherein
the controller performs a dialogue control processing which includes:
recognizing an utterance by the dialogue partner, and determining whether a keyword stored in the keyword table is included in the utterance;
upon determination that the utterance includes a keyword stored in the keyword table, determining that a reply can be made;
upon determination that the utterance does not include the keyword stored in the keyword table, determining that a reply cannot be made;
upon determination that the reply can be made, creating the reply sentence based on the database for replies; and
upon determination that the reply cannot be made, creating, based on the database for introductory remarks and the database for topic change, (i) a sentence for suggesting a change of topic of the plurality of sentences for suggesting a change of topic, (ii) a reply sentence for connecting to the next topic of the plurality of sentences for connecting to a next topic, and (iii) a reply sentence for changing the topic to the next topic, and the controller starts the dialogue control processing triggered by a camera of the dialogue control apparatus taking an image of the dialogue partner with the dialogue control apparatus being turned on.

14. A non-transitory computer-readable recording medium storing a program executable by a computer, the computer including (i) a keyword table storing, for each topic of a plurality of topics, keywords relating to the topic, (ii) a database for replies storing a plurality of different reply sentences for each topic, (iii) a database for introductory remarks storing a plurality of sentences for suggesting a change of topic to a dialogue partner, and (iv) a database for topic change storing a plurality of reply sentences for connecting to a next topic, the program causing the computer to perform a dialogue control processing which includes:

recognizing an utterance by the dialogue partner, and determining whether a keyword stored in the keyword table is included in the utterance;

upon determination that the utterance includes a keyword stored in the keyword table, determining that a reply can be made;

upon determination that the utterance does not include the keyword stored in the keyword table, determining that a reply cannot be made;

upon determination that the reply can be made, creating the reply sentence based on the database for replies; and upon determination that the reply cannot be made, creating, based on the database for introductory remarks and the database for topic change, (i) a sentence for suggesting a change of topic of the plurality of sentences for suggesting a change of topic, (ii) a reply sentence for connecting to the next topic of the plurality of sentences for connecting to a next topic, and (iii) a reply sentence for changing the topic to the next topic, and the program causes the dialogue control processing to start triggered by a camera of the computer taking an image of the dialogue partner.

* * * * *